Nov. 9, 1965   J. D. FOGELQUIST   3,217,307
LINEAR MOTION-PRODUCING DEVICE WITH POSITION INDICATOR
Filed July 17, 1959   5 Sheets-Sheet 1

Inventor:
Jack D. Fogelquist,
by
Attorney.

Nov. 9, 1965  J. D. FOGELQUIST  3,217,307
LINEAR MOTION-PRODUCING DEVICE WITH POSITION INDICATOR
Filed July 17, 1959  5 Sheets-Sheet 2

INVENTOR.
Jack D. Fogelquist
BY
ATTORNEY

United States Patent Office 3,217,307
Patented Nov. 9, 1965

3,217,307
LINEAR MOTION-PRODUCING DEVICE WITH
POSITION INDICATOR
Jack D. Fogelquist, Joliet, Ill., assignor to General Electric
Company, a corporation of New York
Filed July 17, 1959, Ser. No. 827,772
6 Claims. (Cl. 340—188)

This invention relates to fluid-actuated linear motion-producing devices, and it more particularly relates to such devices provided with magnetically actuated remote signalling means which functions to provide an indicatiton of the position of the device at any given time without direct physical connection to the movable parts of the device or without requirement of fluid-tight seals around movable elements.

Such linear motion-producing devices as herein described are useful in a wide variety of applications where controlled linear movement of an object is needed. For example, such devices may be used in machine tools, jacks, hoists, and in linear actuators in general. Such devices may be used in the remote positioning of objects within an enclosure maintained under non-atmospheric conditions of temperature and pressure. For example, one such application is in the positioning of a nuclear reactor control element in the chain-reacting assembly or core of a nuclear reactor to vary the neutron flux and power levels. For purposes of illustration, the present invention is described in this latter context, although it should be understood that this is not a limitation on the utility of the invention. The invention can be readily applied by those skilled in the art in the field of linear positioning and remote position indication devices generally.

The release of large amounts of energy through nuclear fission reactions is well known. In general, a fissionable atom, such as $U^{233}$, $U^{235}$, $Pu^{239}$, or $Pu^{241}$ absorbs a neutron in its nucleus and undergoes a nuclear disintegration. This produces on the average, two fission products of lower atomic weight and great kinetic energy, and usually two or three neutrons also of high energy. For example, the fission of $U^{235}$ produces a light fission product and a heavy fission product with mass numbers ranging between 80 and 110 and between 125 and 155 respectively, and an average of 2.5 neutrons. The energy release approaches about 200 mev. (million electron volts) per fission.

Fission neutrons thus produced diffuse through the nuclear chain-reacting assembly and are either used or lost in several distinct competing mechanisms. Some neutrons migrate to the boundary of the chain-reacting assembly and escape or are lost from the system. Other neutrons undergo non-fission or radiative capture in the nuclear fuel. Still other neutrons undergo fission capture in the fuel producing additional fission neutrons. For example, fast neutrons are thus captured in $U^{235}$ or $U^{238}$ and thermal neutrons are captured in $U^{235}$. Still other neutrons undergo parasitic capture in the various extraneous or nonfissionable portions of the chain-reacting assembly such as in the moderator, coolant, various structural materials necessarily present, fission products, as well as in the nuclear reaction control elements.

The neutron balance between the production of fission neutrons and these various competing mechanisms for neutron utilization determine whether or not, over any given time interval, the fission reaction is self-sustaining, decreasing, or increasing. When the reaction is self-sustaining, the neutron multiplication factor ($k_{eff}$) equals 1.00, the neutron population remains constant, and on the average there is one neutron remaining from each fission event which induces a subsequent fission. Heat generation is thus continuous and it may be maintained so long as sufficient fissionable material is present in the system to override the effects of fission products, some of which are strong nuclear reaction poisons, which will be produced during operation. The heat generated in the system may be removed by passing a coolant through heat exchange relationship with the nuclear fuel in the chain-reacting assembly and such heat may be used as such or to produce mechanical or electrical power.

The neutron balance and therefore the neutron population and the power level in the chain-reacting assembly are variable with the extent to which neutrons are consumed in non-fission capture in the control elements. This consumption of neutrons is in turn variable with the relative amount of control element material present in the chain-reacting assembly at a given time. Control elements are conventionally in the form of rods or sheets or blades which are movably positioned in the chain-reacting assembly. A suitable linear motion-producing device is customarily provided to move the control element and thus control the operation of the reactor. Such control elements contain materials whose atoms have very high non-fission neutron capture cross-sections, some of the common materials being the elemental, alloy, or compound forms of boron, cadmium, gadolinium, europium, erbium, samarium, hafnium, dysprosium, silver, and mercury.

In this and in other applications involving remote positioning of an element, some means for providing at a remote location a reliable indication of the position of the movable element at any given time is required. If a direct mechanical connection to the element is used and the element is located in an enclosure maintained under non-atmospheric conditions, a fluid-tight seal is needed around the connecting means. Such seals are invariably subject to wear, and such wear or partial failure produces fluid leakage. Corrosion or other phenomena may interfere with the freedom of movement of the connecting means and render the indicating means inaccurate. Usually it is not possible to repair or replace the position indicating mechanism without undue interference and frequently a full shutdown of the remote positioning equipment and the equipment with which it is used. Many other problems are also encountered.

It is an object of this invention to provide an apparatus which fully overcomes the aforementioned problems.

It is also an object of this invention to provide an improved remote position indicating device suitable for use in conjunction with remote positioning of an object in systems maintained at non-atmospheric conditions and which does not require the troublesome seals or penetration of the system enclosure.

Another object of this invention is to provide, in a fluid-actuated device for remote positioning of an object within an enclosure maintained at non-atmospheric temperature or pressure, a magnetically actuated position indicating device which operates at atmospheric conditions and is accessible without disturbance of the other parts of the system.

Another object of this invention is to provide, in a linear motion-producing device which can be locked in a plurality of discrete positions, an improved remote position indicating device including circuit and readout means which displays the last indicated position until a new position is reached.

Other objects and advantages of this invention will become apparent to those skilled in the art as the illustration and description of several embodiments thereof proceed.

Briefly, the present invention comprises an improved position indicating apparatus including means for generating a magnetic flux, such as a permanent magnet, secured to a reciprocable element, at least one and preferably a plurality of magnetically actuated electrical switches disposed along the path of reciprocable element movement in an elongated non-magnetic probe tube. A position indicating circuit is connected to the magnetic switches and it includes a relay circuit and an indicating circuit. The relay circuit includes a plurality of interlocked relays whereby the position indicated by the indicating circuit remains unchanged after a given magnetic switch opens and until the switch at the next adjacent position is actuated by the magnet means. The present invention also comprises a linear motion-producing device including the position indicator.

The structure and the operation of several embodiments of the present invention will be more readily understood by reference to the accompanying drawings in which.

Figures 1, 2, 3:
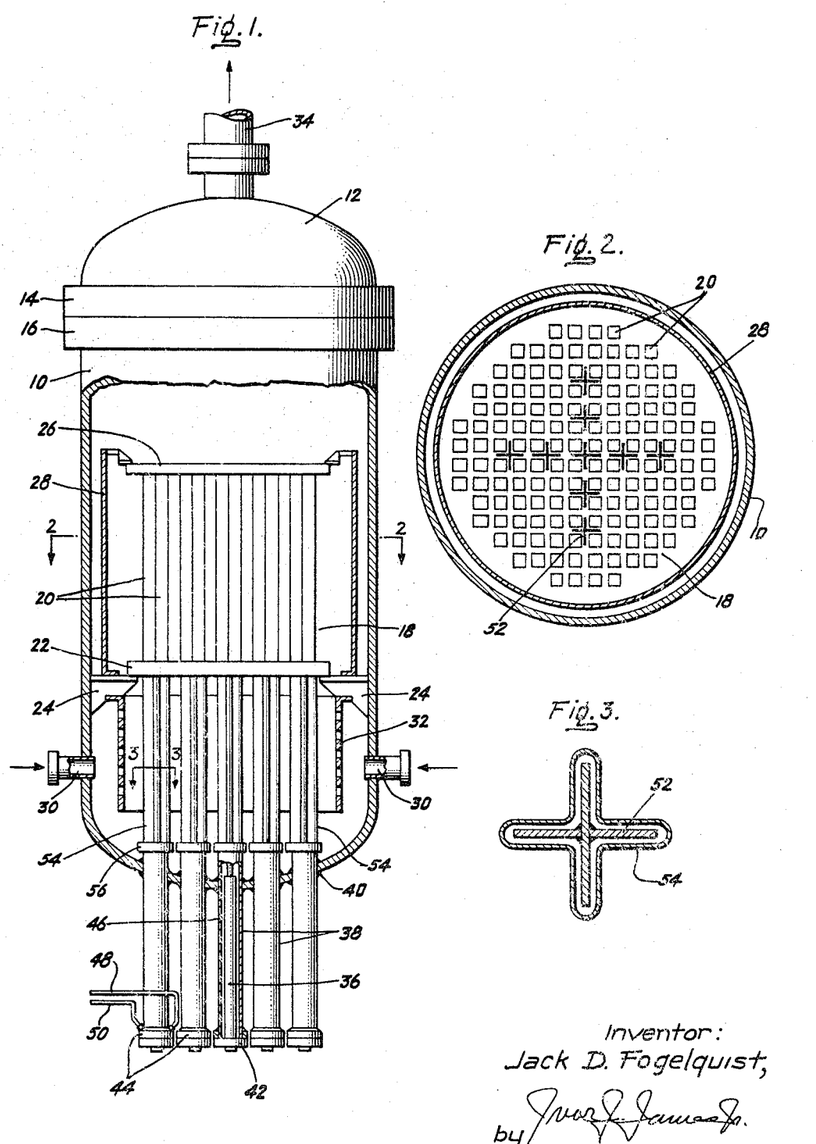
FIGURE 1 is an elevation view in partial cross-section showing schematically a nuclear reactor in which the device of this invention may be used in connection with the movement of nuclear reaction poison control elements.
FIGURE 2 is a transverse cross-section view taken through the core as shown in FIGURE 1.
FIGURE 3 is an enlarged transverse section view showing the control elements indicated in FIGURE 2.

Referring particularly to FIGURE 1, a reactor pressure vessel 10 is provided with removable head 12 and flanges 14 and 16. A nuclear chain-reacting assembly or core 18, made up of a plurality of vertically disposed nuclear fuel-containing coolant flow channels 20, is supported within vessel 10 by means of lower core support plate 22 which in turn is secured in vessel 10 by support means 24. Upper core grid guide 26 is provided to secure the upper ends of channels 20 and maintain the relative spacing therebetween. A thermal shield 28 surrounds the reactor core 18 and is spaced inwardly from the inner surface of pressure vessel 10. The thermal shield is supported from support means 24 and functions to attenuate the intense gamma radiation emmitted by the core to minimize thermal heating of the pressure vessel wall.

The upper and lower ends of channels 20 are open to coolant flow. The coolant is introduced to vessel 10 through inlet openings 30. The coolant flows through a perforated cylindrical coolant diffuser 32 and then upwardly through flow channels 20. The heated coolant, which is partially vaporized in the case of a boiling reactor for example, is removed from vessel 10 through coolant outlet 34.

The control element drive mechanism illustrated schematically at 36, including the remote position indicating means of this invention, is an integral unit contained in a thimble or pressure vessel extension 38 attached as by means of welds 40 to the wall of pressure vessel 10. The control elements in this reactor core enter from the bottom; they are withdrawn downwardly out of the core to start up and to raise the power level of the reactor and are inserted upwardly into the reactor core to decrease the power level or shut the reactor down. The control elements can, if desired, be inserted from the top of the core. The distribution of control elements in reactor core 18 and the cross-section of a typical control elements are detailed in FIGURES 2 and 3.

In FIGURE 2 a transverse section of the reactor apparatus in FIGURE 1 is shown. Reactor core 18, made up of a plurality of fuel-containing flow channels 20 is surrounded by thermal shield 28, the whole being contained in reactor vessel 10. The flow channels are here shown as being square in cross-section, although other flow channels having circular, hexagonal, or other cross-sections may be employed. In this modification channels 20 are spaced slightly apart from one another in a lattice having a square pitch. Cruciform control elements 52, which may conveniently be 2 percent boron stainless steel, are spaced throughout the lattice. These control elements are movable into and out of reactor core 18 and their position is remotely indicated by means of the device of the present invention.

In FIGURE 3 is shown a cross-section view taken as indicated in FIGURE 1 of one of the cruciform control elements 52 which is contained in a guide tube 54, also of cruciform cross-section.

Referring again briefly to FIGURE 1, the control element guide tubes 54 are shown extending from core support plate 22 downwardly to upper flange 56 of each of thimbles 38. The control elements 52 are withdrawn downwardly from reactor core 10 into these guide tubes 54.

Figures 4, 5, 6, 7:
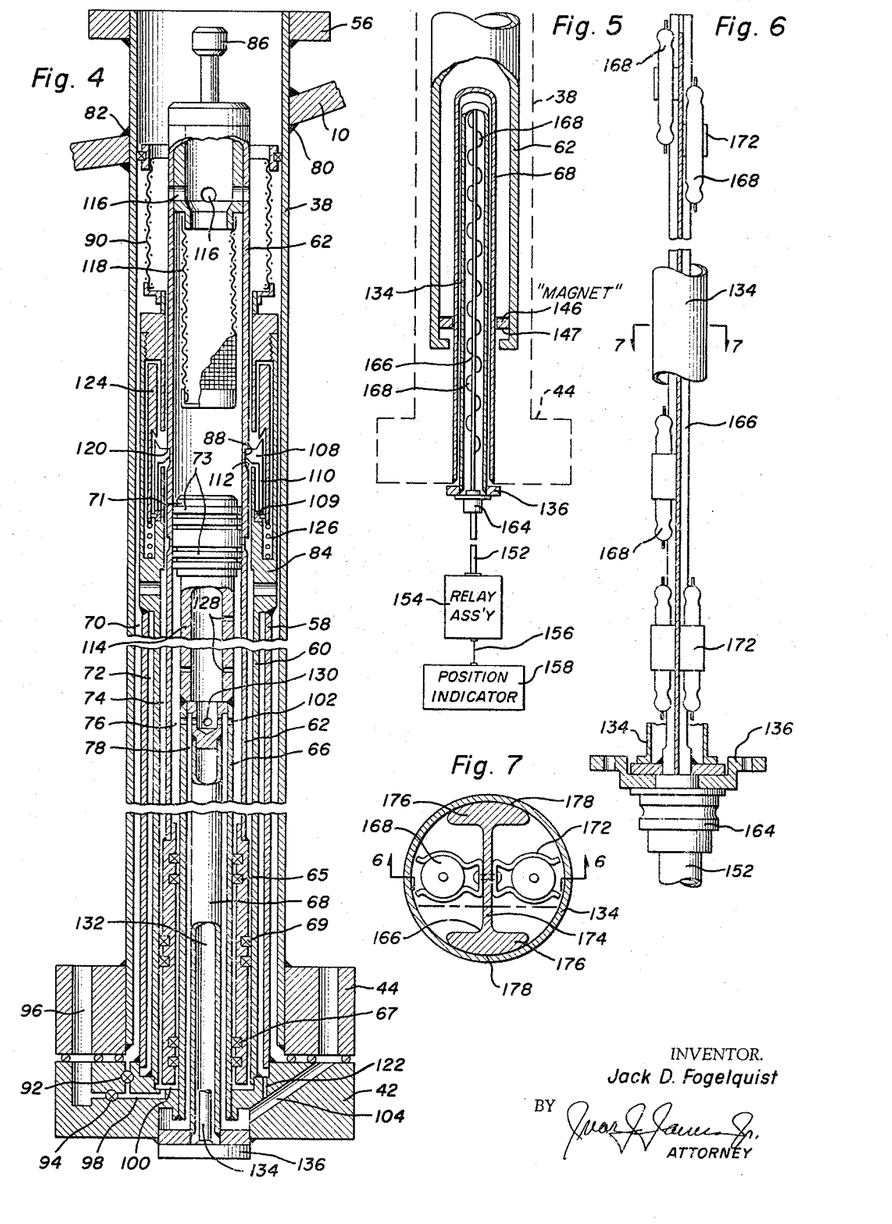
FIGURE 4 is a longitudinal cross-section view of a fluid-actuated control element drive mechanism in which provision is made for incorporation of this invention.
FIGURE 5 is a schematic drawing of this invention indicating the relationship between the several essential parts.
FIGURE 6 is a longitudinal cross-section view of one embodiment of the probe assembly of this invention showing the placement of the magnetically operated switches.
FIGURE 7 shows a transverse cross-section view of the probe assembly shown in FIGURE 6.

The device of FIGURE 4, in which this invention is embodied, include jacket 58, outer tube 60, both stationary, piston connecting or reciprocable tube 62 provided with driving piston 64 at its lower end, stationary inner tube 66, and position indicator tube 68 at successively smaller radii from the longitudinal centerline of the device. In the device shown, the tubular means are right circular cylinders; however, other hollow tubular elements with other geometric cross-sections such as square, hexagonal, rectangular, and the like may be substituted.

The concentric relationship of the elements specified provides a plurality of annuli therebetween used in this device for the transmission and displacement of fluid into and out of the device during operation. These annuli include thimble annulus 70, jacket annulus 72, outer tube annulus 74, piston connecting tube annulus 76, and inner tube annulus 78.

As indicated, thimble 38 is secured at its upper end, as by means of welds 80 and 82 to pressure vessel 10 and is provided at its lower end with thimble flange 44 to which the thimble is similarly secured. Jacket 58 and outer tube 60 are both secured at their lower ends to lower flange 42. They are joined at their upper end and provide support for double-walled extension 84 in which a locking device is disposed in an unlocking annulus. Inner tube 66 and position indicator tube 68 are integrally secured to one another at their upper end and are also integrally secured at their lower ends to lower flange 42.

Driving piston 64 is provided at its upper and lower ends with inner piston rings 65 and 67 which contact and seal against the outer surface of inner tube 66. Driving piston 64 is further provided with outer piston rings 69 which contact and seal against the inner surface of outer tube 60. These seal rings permit the driving piston to drive piston 64 upwardly or downwardly depending upon the direction of the pressure differential applied. The upper ends of tubes 66 and 68 are joined together and provided with extension tube 114 having a head 71 and a plurality of seal rings 73 sealing against the inner surface of reciprocable tube 62.

Between these two inner and outer stationary tubular elements 66 and 62 respectively, piston 64 and tube 62 are reciprocable.

The other end of reciprocable tube 62 is provided with spud 86 to which the object to be positioned is attached. In the context of this illustration, this object is a linearly reciprocable control element of a nuclear chain-reacting assembly as previously indicated. The outer surface of reciprocable tube 62 is provided with a plurality of peripheral locking grooves 88 of particular shape and which cooperate with the locking means referred to above to permit the drive mechanism to be securely locked in at least one and preferably a plurality of discrete positions.

The device of FIGURE 4 is essentially a fluid piston actuator which is locked or latched in discrete positions. The locking means which it includes prevents withdrawal of the control elements from a nuclear reactor to produce increased reactivity unless the locking device is intentionally unlatched. The mechanism, however, is free to travel in the insert or decreased reactivity direction without the unlocking signal whenever the appropriate driving piston fluid is applied.

In FIGURE 4 the device is shown locked in its lowest position as the drawing is normally viewed; that is, the control element attached to spud 86 is fully withdrawn from the reactor. The device provides for two sources of fluid driving pressure which is operative to move piston 64 and reciprocable tube 62 upwardly or into the reactor. The first source is fluid pressure from within reactor vessel 10. Such fluid may flow through the upper open end of thimble 38, through filter screen 90, and do downwardly through thimble annulus 70 to a pressure responsive three-way valve mechanism schematically shown in flange 42 as including valves 92 and 94. The second source is fluid pressure from an external accumulator supplied through flanges 44 and 42 by means of channel 96 which communicates with the three-way valve system. The three-way valve system communicates through channel 98 with chamber 100 immediately below driving piston 64. The three-way valve system 92 and 94 operates to deliver through channel 98 to chamber 100 fluid from either the separate accumulator or the reactor vessel, depending upon which is at the higher pressure. Thus if the accumulator pressure falls by a predetermined amount below the reactor pressure, the reactor fluids are used to drive the control elements into the reactor to shut it down. Also, in the event the vessel pressure rises to a value in excess of a predetermined amount above the accumulator pressure, valve 92 will open and valve 94 will close automatically upon sensing this excessive pressure, driving piston 64 and reciprocable tube 62 upwardly, shutting down the reactor.

The upward motion of piston 64 displaces fluid from reciprocable tube annulus 76 outwardly through openings 102 into inner tube annulus 78 from which it may flow outwardly through channel 104 indicated in flanges 42 and 44. Fluid displaced from outer tube annulus 74 is displaced through openings 106 into thimble annulus 70.

Groove 88 is asymmetrical in that it has at one end a lock surface 120 substantially at right angles to the outer surface of reciprocable tube 62, and at the other end has a long chamfer or cam surface 112 bearing an acute angle to the outer surface. This acute angle may be between about 5 degrees and about 45 degrees. The locking device includes locking blocks 108 which are normally biased inwardly into engagement with grooves 88 by cantilever spring fingers 110, extending longitudinally from a collar 109. Blocks 108 are correspondingly asymmetrical and are cammed outwardly by direct contact with the lower long chamfer or cam surface 112 in groove 88 upon upward motion of tube 62, but remain engaged in groove 88 if a load is applied to tube 62 tending to move it downward. The locking means is thus unidirectional, permitting free upward movement of reciprocable tube 62.

By reversing the positions of the lock and the chamfer surfaces 112 and 120 and reversing the corresponding surfaces on locking blocks 108, the lock is unidirectional in the opposite direction.

The upward movement referred to above increases the volume within reciprocable tube 62 above the upper end of extension 114 of inner tube 66 and position indicator tube 68. To prevent the formation of a vacuum from restraining the upward motion, openings 116 are provided near the upper end of reciprocable tube 62 into which reactor vessel fluids may flow inwardly through inner screen 118.

To move the driving piston 64 and reciprocable tube 62 downwardly, the locking device must first be actuated and unlocked. When locked, the flat or slightly undercut upper surface 120 at the upper end of locking groove 88 contacts directly the corresponding upper lock surface of locking block 108 and prevents downward movement. The down driving fluid signal is applied from a separate accumulator through channel 104 in flanges 42 and 44, upwardly through inner tube annulus 78 to the upper end of the structure, outwardly through openings 102 into reciprocable tube annulus 76 which is sealed at its upper end, and downwardly through this annulus against the upper end of piston 64. Simultaneously, an unlocking piston signal is transmitted from channel 104 through channel 122 upwardly into jacket annulus 72 to the upper end thereof, and through a communicating channel located 90 degrees around double-walled extension 84 from the plane of openings 106. This signal enters extension 84 at the upper end of jacket 58 and outer tube 60 and in which the unlocking piston 124 and the locking means are located. This signal moves unlocking piston 124 downwardly against its loading spring thereby engaging the upper end of locking blocks 108 moving them outwardly out of locking grooves 88. This unlocks the device and permits the downwardly acting fluid forces on driving piston 64 to move reciprocable tube 62 downwardly at a rate determined by the pressure differential and the rate of flow of fluid in through channel 104.

In the nuclear reactor application, it is desirable to provide for the rapid insertion of the control elements into the reactor core in case of emergency. The movement in such case may be at high velocity required to move the control elements 10 or 12 feet in a matter of one or two seconds. To dissipate the kinetic energy of the moving equipment at the end of the structure, braking orifices 128 are provided in the wall of extension 114 just below head 71. During upward movement of reciprocable tube 62, the displaced fluids normally flow inwardly through openings 102. These openings are, however, placed such that upper seal rings 65 will pass over openings 102 a short distance before the end of the stroke, thus preventing flow of displaced fluid through these relatively large areas. The only remaining opening for displaced fluid flow is that provided by braking orifices 128 which, being superimposed one above the other, are progressively shut off by seal rings 65 during the remaining motion. The kinetic energy is dissipated through displacement of fluids through braking orifices 128 at high velocity and high pressure drop bringing the mechanism to a gradual stop at the upper end of the structure. The fluids displaced through orifices 128 escape from extension 114 outwardly through openings 130 into inner tube annulus 78.

Position indicator tube 68 is provided with an internal opening 132 into which the magnetically actuated position indicator of this invention is inserted. Such a position indicator probe tube 134 provided with connecting flange 136 is indicated at the lower end of FIGURE 4 and is hereinafter described in detail.

FIGURE 5 is a schematic view of the remote position indicating system of this invention applied to the linear motion-producing device described immediately above. Elements also shown in FIGURE 4 are here indicated by the same numerals. Thimble 38 and its lower flange 44 are outlined. Stationary inner position indicator tube 64 secured to flange 44, reciprocable tube 62, probe tube 134 and its flange 136 are also shown in simplified form. Permanent magnet 146 is secured at the lower end of reciprocable tube 62 and moves with it. Preferably the magnet is provided with a corrosion-resistance clad 147 such as stainless steel or the like. The magnet is toroidal in shape thereby providing a high magnetic flux at the point where the longitudinal centerline of the device penetrates toroidal magnet 146. The device of the present invention includes switch assembly contained in probe tube 134 connected by means of cable 152 to a relay assembly 154 which in turn is connected by cable 156 to a remote position indicator means 158. The probe tube flange 136 is provided with a cable connector 164 at its lower end. Tube 68 is fabricated of material such as Monel, series 300 stainless steels, or any other such material having a relatively low magnetic permeability and appropriate corrosion resistance. It functions as a barrier between the non-atmospheric conditions existing withing the drive mechanism and the atmospheric conditions existing around and in the position indicator device of this invention. Probe tube 134 also is a material of relatively low magnetic permeability. The walls of tubes 68 and 134 thus do not interfere with the magnetic field generated by magnet 146.

Supported from probe flange 136 is an elongated switch support element 166, the cross-section of which is illustrated in FIGURE 7. This member supports a plurality of superimposed spaced-apart magnetically actuated switches 168 throughout the length of probe tube 134. These are successively actuated by the magnetic field of permanent magnet 146 as it moves into proximity to each individual switch. The strength of the field, the sensitivity of the switches, and the distance between the switch and the magnet can be readily adjusted so that only one switch is actuated at a time, or that only two adjacent switches are simultaneously actuated. The switches are connected into a circuit, hereinafter more clearly described, which permits the presentation or readout of the position information at a remote point in a variety of manners.

In FIGURE 6 is shown a longitudinal detailed cross-section view of the probe and switch assembly indicated schematically in FIGURE 5. Switch wiring has been omitted from this figure. Probe tube 134 is supported at its lower end from flange 136 to which cable connector 164 is employed to secure cable 152 to the assembly. Switch support element 166 extends longitudinally through probe tube 134. Magnetic switches 168 are secured by means of clips 172. In connection with the control element drive mechanism described in FIGURE 4, the longitudinal spacing between the various magnetic switches 168 coincides with the spacing between successive lock positions of the drive mechanism.

Magnetic switches of the type herein shown are available items of commerce, one suitable switch being designated by catalog number E-5600-43 and available from Revere Corporation of America. In general, these switches are single pole, single throw switches provided with a soft iron armature on the movable electrode and are sealed in a glass capsule with electric leads brought out through a metal-to-glass seal. There are, of course, other magnetically actuated switches which are commercially available and are suitable for use in the device of this invention.

In FIGURE 7 a transverse cross-section view of the device in FIGURE 6 is shown. Probe tube 134 encloses switch support 166 from which clips 172 support magnetic switches 168. The switch support 166 is in effect an "I" beam including a web 174 and flanges 176 whose outer surfaces 178 are rounded to form a cylindrical surface whose radius is slightly less than the inside radius of probe tube 134 to form a snug fit. The magnetic switches and the switch support are thus securely fixed in position within the probe tube.

Figure 8:
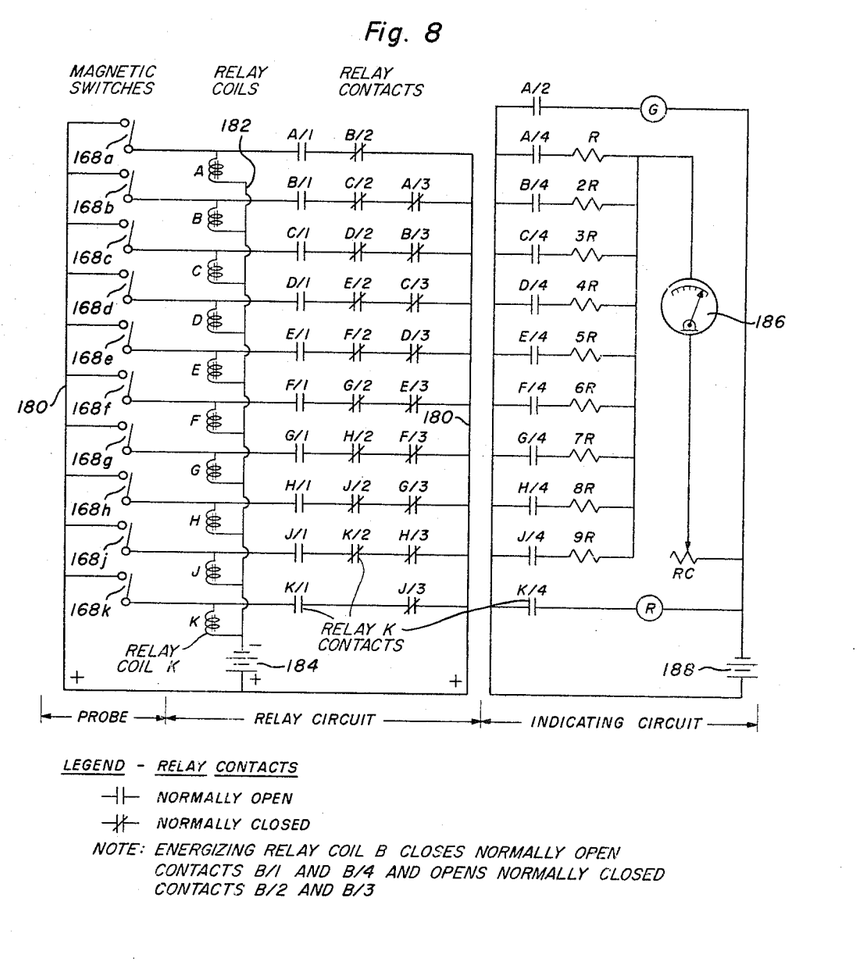
FIGURE 8 is a circuit diagram of one embodiment of this invention including a relay circuit and a position indicating circuit having a milliammeter which does not fall to zero reading while the magnet moves between adjacent unactuated switches.

In FIGURE 8 are shown relay and indicating circuits suitable for use in one embodiment of this invention. All parts of the circuit are shown in the de-energized position. A series of 10 magnetic switches 168a through 168k are provided. One pole of each switch is connected to first positive bus 180. The other pole of each switch is connected in series with one of the 10 relay coils designated A through K, the other end of each relay coil being connected to negative bus 182. Power supply 184 is connected between the positive and negative busses. Each relay coil, when energized, actuates a plurality of relay contacts in the circuit. Some contacts are normally open, some are normally closed as indicated in the legend. For example the relay contacts which are actuated by energizing relay coil B include normally open contacts B/1 and B/4 and normally closed contacts B/2 and B/3. Indicating milliammeter 186 is provided to indicate the position of the magnet which in turn is determined by the particular magnetic switch which is actuated or was most recently actuated. A step-wise movement between discrete current readings on milliammeter 186 corresponding to the discrete lock positions of the drive mechanism is provided by a series of fixed resistances R through 9R each having a different resistance which are connected one at a time in series with the milliammeter by means of the nine relay contacts A/4 through J/4. Variable resistance RC is provided to adjust the reading of the milliammeter.

The circuit is interlocked so that the position of the control element drive mechanism at its last position always remains indicated at milliammeter 186 until the drive mechanism approaches the next adjacent locking position and actuates the switch corresponding to the position. For example, when the permanent magnet appears adjacent and closes magnetic switch 186f, relay coil F is energized, normally open contacts F/1 and F/4 are closed, and normally closed contacts F/2 and F/3 are opened. This provides relay coil F with two sources of energizing current. One is by series connection through magnetic switch 186f between the first positive bus 180 and negative bus 182, and the second is through the series connection of contacts F/1, G/2, and E/3 between negative bus 182 and second positive bus 180'. It should be noted that since relay coil F is energized, contacts F/1 are closed, and since relay coils E and G, corresponding to the immediate adjacent lock and magnetic switch positions, are de-energized, normally closed contacts G/2 and E/3 are closed completing the second current source. Relay coil F is thus held energized by the second supply of current through one of its own normally open contacts F/1, even though magnetic switch 186f opens as the magnet moves toward switch 168e or 168g. In this condition, a fixed resistance 6R is switched in series with indicating milliammeters 186 by means of normally open contacts F/4 whereby the meter indicates a given position even though switch 186f opens in the subsequent movement.

As the permanent magnet moves toward magnetic switch 168g, for example, switch 168f opens, but relay coil F remains energized by the second source of current and the meter remains in the same position as described. When the permanent magnet arrives at the appropriate position to actuate switch 168g, relay coil G is energized, closing normally open contacts G/1 and G/4, and opening normally closed contacts G/2 and G/3. Since normally closed contacts G/2, in series with the second source of current to relay coil F, are opened, relay coil F is de-energized, dropping resistance 6R out of the circuit at the same time a new resistance 7R is switched into series with milliammeter 186 advancing it to the new position. This action is repeated for the remaining positions of the drive mechanism moving in either direction.

When the drive mechanism is fully extended, switch 168a is actuated placing resistance R in the milliammeter circuit and connecting green pilot light G across power supply 188. In a nuclear reactor drive system, this is the safe or shutdown position. When the drive mechanism is fully withdrawn from the core, magnetic switch 186k is actuated and contacts K/4 are closed lighting red pilot light R.

Figure 9:
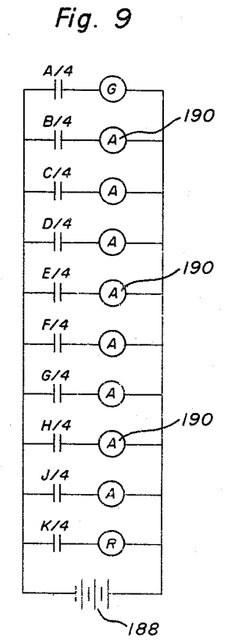
FIGURE 9 is a circuit diagram showing another embodiment using pilot lights which can be substituted for the indicating circuit shown in FIGURE 8.

In FIGURE 9 is an alternative embodiment of the indicating circuit portion of this invention. This embodiment includes power supply 188 and normally open relay contacts A/4 through K/4 as before. A series of pilot lights are here employed to indicate the individual positions and one light is connected in series with each set of contacts. Extreme position pilot lights G and R are provided as in FIGURE 8 and a plurality of amber or other colored pilot lights 190 are provided to indicate the intermediate positions. In this embodiment only a single light is illuminated at a given time showing the relative position of the drive mechanism.

Figure 10:
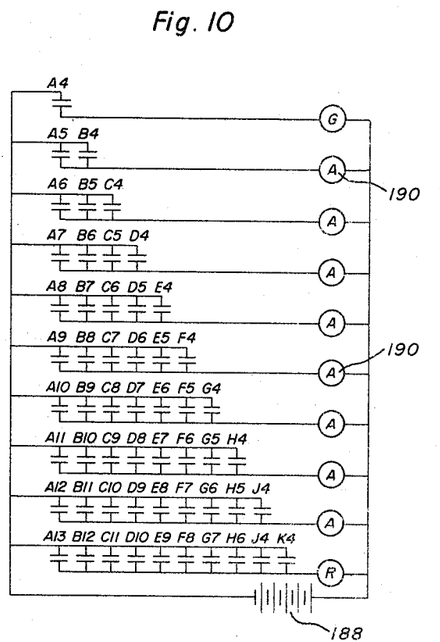
FIGURE 10 is a circuit diagram of another embodiment including a relay circuit using pilot lights which light and remain lighted as the magnet moves in one direction and which are extinguished one by one as the magnet passes in the return direction, which circuit can also be substituted for the indicating circuit shown in FIGURE 8.

In FIGURE 10 a second alternative embodiment of indicating circuit employing a similar series of pilot lights and power supply 188 are shown. Pilot lights G, 190, and R are provided corresponding to each locked and extreme position. Each is connected to power source 188 in series with a normally open set of relay contacts operated by the relay corresponding to that position. Each set of such normally open contacts is also connected in parallel with a normally open set of contacts operated by a relay corresponding to any other positions in one direction along the path of reciprocable element movement. The pilot lights light in sequence and remain lighted as the drive mechanism and the reciprocable element advance in one direction, and which are extinguished one by one as it returns in the other direction. For example, when the drive mechanism is in the fully inserted position, relay coil A, described in FIGURE 8, is actuated closing all of contacts A/4 through A/14 thus illuminating all intermediate pilot lights 190 and green and red pilot lights G and R. As the drive mechanism is withdrawn from the core step by step, relay A remains energized until relay B is energized. Relay A then is de-energized opening all contacts A/4 through A/14 but only green pilot light G is extinguished because at this point contacts B/4 through B/12 are closed, the others remain lighted. Further movement opens contacts B/4–B/12, C/5–C/11, etc., in order, extinguishing the intermediate pilot lights 190 one by one in order. The column of illuminated pilot lights in FIGURE 10 thus presents a corresponding picture of the position of a control element. When the drive mechanism is fully withdrawn, only relay coil K is energized, only contact K/4 is closed, and thus only red pilot light R is lighted.

Figure 11:
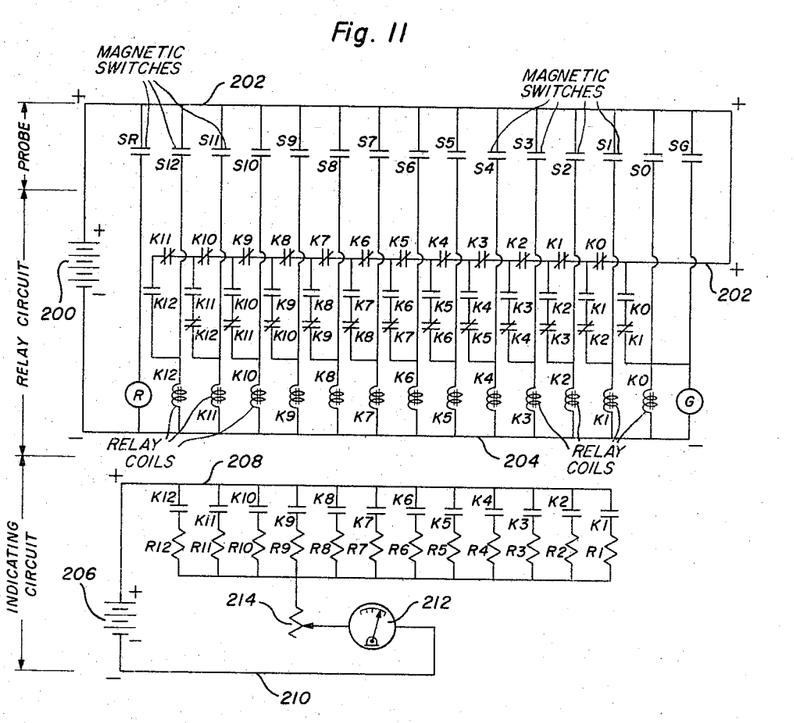
FIGURE 11 is a circuit diagram of another embodiment of this invention including another relay circuit and a position indicating circuit.

In FIGURE 11 is shown another embodiment of this invention which consists of a modification of the circuit shown in FIGURE 8 and includes a probe circuit, relay circuit and indicating circuit. Power supply 200 is provided connected between first positive bus 202 and negative bus 204 in the relay circuit. Second positive bus 202' is provided also. Power supply 206 is connected between positive bus 208 and negative bus 210 in the indicating circuit which includes indicating milliammeter 212 and a plurality of resistances R . . . R12. A variable resistance 214 is provided to adjust the meter reading.

This circuit is shown for a drive mechanism having 13 lock positions and two additional extreme positions at each end of the stroke. A plurality of 15 magnetic switches is provided throughout the drive mechanism stroke. In the probe circuit the magnetic switches are designated SG for the "in" position, S0 through S12 for intermediate positions, and SR for the "out" position. Switches SR and SG are connected in series with red and green pilot lights R and G respectively between the positive and negative buses 202 and 204. Switches S0 through S12 are each connected in series with relay coils K0 through K12 respectively between these same buses in the relay circuit. Relay contacts actuated by a given relay coil are designated by the relay coil number; that is, energizing relay coil K5 opens all normally closed contacts K5 and closes all normally open contacts K5. Note that this includes a set of normally open contacts in the indicating circuit. Normally open and normally closed contacts are indicated as in the legend in FIGURE 8.

In the relay circuit, three horizontal rows or sets of relay contacts are shown. The normally closed contacts in the upper row or first set function during a scram or fast insertion of the control element and insure that excessive current drain on the power supplies does not occur if several relays should remain in the energized position. The normally open contacts in the middle row or second set and the normally closed contacts in the lower row or third set function to prevent the position indicating milliammeter 212 in the indicating circuit from falling to zero while the magnet moves between two adjacent switch positions and while neither switch is closed. The second set of contacts function on upward movement into the core, holding the preceding "lower" relay coil energized until the next higher relay coil is energized. The third set of contacts function on downward movement out of the core holding the preceding "higher" relay coil energized until the next lower relay coil is energized.

In the indicator circuit, a fourth set of normally open relay contacts are provided which connect resistances R1 through R12 in series with meter 212 as the drive mechanism moves.

With the element fully inserted, magnetic switch SG is actuated lighting green pilot light G. There is at this stage a zero reading of the indicating milliammeter 212 since the indicating circuit is open. Downward movement of the control element to the first position opens switch SG, closes switch S0 energizing coil K0 and actuating its associated contacts. This provides relay coil K0 with two paths for energizing current flow (1) through switch S0 and (2) through contacts K1 and K0 in the third and second relay sets. Pilot light G remains lighted. Downward movement to the next position opens switch S0 and closes switch S1. Relay coil K0 is kept energized after switch S0 opens and before switch S1 closes due to contact K0 in the second set. Relay coil K0 is de-energized when switch S1 closes energizing relay coil K1 and opening contact K1 in the third set. De-energizing relay coil K0 extinguishes green light G and closes contact K0 in the first set and permits relay coil K1 to be energized through contacts K0 in the upper set, K1 in the second set, and K2 in the third set when switch S1 is opened. It also switches R1 in the indicating circuit into series with the indicating milliammeter 212.

Further downward movement opens switch S1, relay coil K1 is kept energized by contact K1 in the second set until switch S2 is closed which energizes relay coil K2 and in turn de-energizes relay coil K1 by opening contact K2 in the third set. It also switches R2 into series with milliammeter 212 giving a new position reading. These actions are repeated stepwise for full downward movement until switch SR is actuated lighting red pilot light R and the corresponding milliammeter reading indicates the rod in the all-out position.

With the elements fully withdrawn, switch SR is closed lighting red pilot light R. Upward movement of the rod away from switch SR reduces the magnetic flux at SR allowing it to open extinguishing pilot light R. Proximity of the magnet to switch S12 will close it. Relay coil K12 is thus provided with two paths for flow of energizing current; (1) through switch S12, and (2) through contacts K12 in the second set and all the serially connected normally closed contacts K11 through K0 in the first set. R12 is in series with meter 212 showing the element position. Further upward movement opens switch S12, relay coil K12 remains energized through contact K12 in the second set holding R12 in the indicating circuit until switch S11 closes. This energizes relay coil K11 and de-energizes relay coil K12 by opening contact K11 in the first set. R11 is hereby switched into the meter circuit presenting the new position. Relay coil K11 now has two paths for energizing current; (1) through switch S11 and (2) through contact K12 in the third set and contact K11 in the second set and the serially connected contacts K10 through K0 in the first set.

Further upward movement opens switch S11, relay coil K11 remains energized due to contacs K12 in the third set and contact K11 in the second set until switch S10 is closed. This de-energizes relay coil K11 due to opening of contact K10 in the first set and switches R10 into the milliammeter circuit showing the new position. This sequence of actions continues until the control elements are fully inserted and switches S0 and SG are actuated lighting green pilot light G.

Due to residual magnetism, friction, and inertial effects, a rapid (2.5 seconds) upward movement into the core (scram), in the absence of contacts K0 through K11 in the first set, may tend to leave a plurality of relays at a given instant connected between the buses and energized. The resultant current drain on the power supply may be excessive. The contacts in the first set on upward or scram movement open immediately breaking the series connection and deenergizing all relays corresponding to lower positions. For example, as the magnet in moving upward in scram closes switch S5, relay coil K5 is energized, contact K5 in the first set opens de-energizing relay coil K6 and all other relay coils from K6 to K12 which may still be in the energized position. Thus, not enough relay coils can be actuated at any one time to exceed the capability of the system.

Essentially, in the FIGURE 11 embodiment of the invention, each relay field coil is connected in series with a magnetic switch across the power source. Each field coil is also connected in series with (1) a normally open set of contacts operated by that relay, (2) a normally closed set of contacts operated by a relay which in turn is actuated by a magnetic switch corresponding to the immediately adjacent reciprocable element position along the element stroke or path in one direction, and (3) a normally closed set of contacts operated by any relay which in turn is actuated by a magnetic switch corresponding to positions along the path in the other direction.

As an example of the present invention, the following data are given illustrating the application of this invention to indicate the position of hydraulically actuated control element drive mechanisms similar to those shown in FIGURE 4 in a light water-moderated and cooled nuclear reactor similar to that shown in FIGURE 1.

The nuclear reactor is moderated and cooled by boiling natural water at 1,000 p.s.i.a. and about 545° F. The reactor vessel is 12.5 feet inside diameter, 41.5 feet inside height, and has a wall thickness of 5.5 inches including an internal clad of type 304 stainless steel approximately 0.375 inch thick. The chain-reacting assembly or core consists of 466 nuclear fuel-containing flow channels 9.9 feet along and of square cross section and approximately 4.5 inches on a side. The reactor core approximates the shape of a right circular cylinder fitting into a circumscribed circle 9.5 feet in diameter. Each flow channel or fuel assembly contains 36 fuel rods approximately 0.5 inch in diameter, spaced approximately 0.75 inch center to center, and arranged in a square 6 by 6 array. Each fuel rod contains sintered uranium dioxide ($UO_2$) fuel enriched to contain 1.5 atom percent of $U^{235}$. The fuel elements are clad in zirconium alloy tubing. The individual fuel channels are spaced apart from one another and arranged in a square lattice. The 88 control elements are positioned between the fuel channels and more or less uniformly distributed throughout the cross section of the core. The control elements are approximately 10 feet long, have a cruciform cross section of approximately 6.5 inches in width and 0.375 inch in thickness, and consist of stainless steel containing 2 percent by weight of natural boron. The reactor has a rated heat release of 686 thermal megawatts and is cooled by 26.5 million pounds of water per hour introduced into the core. Steam is produced at 1.5 million pounds per hour.

The linear motion-producing device used as the control element drive is hydraulically actuated, is approximately 12 feet long, 3.50 inches outside diameter, and has an inner position indicating tube about 10 feet long, 1.50 inch outside diameter, and 0.120 inch in wall thickness fabricated of a series 300 stainless steel to contain the position indicating device of this invention.

The position indicator probe tube is 0.49 inch in inside diameter, 0.12 inch in wall thickness, and is fabricated of a series 300 stainless steel. The structure of the device is substantially as indicated in FIGURES 6 and 7. The lock positions of the device were about 9 inches apart and accordingly magnetically actuated switches S0 through S12 were spaced apart this same distance along the length of the switch support element contained within the probe tube. Secured to the lower end of the reciprocable tube and driving piston is a permanent magnet fabricated of Almco V encased in a series 300 stainless steel container. The magnet is 0.85 inch high, and has a 1.50 inch inside diameter and a 2.10 inch outside diameter. A 16-conductor cable connects the end of the probe assembly to the indicating circuit described in FIGURE 11. Rigid testing of the device indicated its ability to indicate remotely the successive positive positions of the control rod drive mechanism.

Several particular embodiments of this invention have been described in considerable detail by way of illustration. It should be understood that various other modifications and adaptations thereof may be made by those skilled in this particular art without departing from the spirit and scope of this invention as set forth in the following claims.

I claim:

1. An improved position indicating apparatus which comprises means for generating magnetic flux secured to and movable with a reciprocable element, a plurality of magnetically actuated switches disposed at discrete positions along the path of movement of said reciprocable element and adapted to be actuated individually by said magnetic flux, and circuit means connected to said plurality of switches to provide an indication of reciprocable element position; said circuit means comprising a relay circuit and an indicating circuit; said relay circuit including a power source, a plurality of relays each operating a plurality of contacts and each of said relays having a field coil connected to said power source in series with a corresponding one of said switches, each of said field coils also being connected to said power source in a second series circuit including a normally open set of contacts operated by said relay and a normally closed set of contacts operated by any relay which is actuated by a magnetic switch corresponding to the immediately adjacent reciprocable element positions along said path, whereby each relay remains actuated and the position indicated by said indicating circuit remains unchanged after the magnetic switch connected in series with said relay is deactivated and until the switch at the immediately adjacent position is actuated.

2. An apparatus according to claim 1 wherein said indicating circuit includes a power source, a set of normally open contacts operated by each relay, and a pilot light corresponding to each reciprocable element position and connected in series with each said set of contacts to said power source whereby a single light is illuminated at a given time indicating the reciprocable element position.

3. An apparatus according to claim 1 wherein said indicating circuit includes a power source, a set of normally open contacts operated by each relay, a pilot light corresponding to each discrete reciprocable element position, each pilot light being connected to said power source in series with one of said normally open sets of relay contacts operated by the relay corresponding to said position, said set of contacts being connected in parallel with a normally open set of contacts operated by each relay corresponding to any other positions in one direction along said path whereby said pilot lights light in sequence and remain lighted as said reciprocable element advances in one direction and are extinguished one by one as it returns in the other direction.

4. An apparatus according to claim 1 wherein said indicating circuit includes a power source, a plurality of sets of normally open contacts operated by said plurality of relay, current indicating means, a plurality of fixed resistances each having a different resistance and each corresponding to one of said discrete positions, each fixed resistance being connected to said power source in series with said current indicating means and with one of said sets of normally open contacts to provide at said current indicating means a series of discrete current readings corresponding to the discrete positions of said reciprocable element.

5. An improved position indicating apparatus for a reciprocable element which comprises means for generating magnetic flux secured to and movable with said reciprocable element, a plurality of magnetically actuated switches disposed at discrete positions along the path of movement of said reciprocable element and adapted to be actuated by said magnetic flux, and circuit means connected to said plurality of switches to provide an indication of reciprocable element positions; said circuit means comprising a relay circuit and an indicating circuit; said relay circuit including a power source; a plurality of relays each operating a plurality of contacts and each relay having a field coil connected to said power source in series with a corresponding one of said switches, each of said field coils also being connected to said power source in a second series circuit including a normally open set of contacts operated by said relay and, except for field coils which are actuated by switches corresponding to the extreme reciprocable element positions along said path, with two normally closed sets of contacts operated respectively by the relays which are actuated by the magnetic switches corresponding to the immediately adjacent reciprocable element positions along said path, each of said field coils actuated by switches corresponding to said extreme positions being also connected to said power source in series with a normally closed set of contacts operated by the relay which is actuated by the magnetic switch corresponding to the immediately adjacent reciprocable element position whereby each relay remains actuated and the position indicated by said indicating circuit remains unchanged after the magnetic switch connected in series with said relay is deactivated and until the switch at the adjacent position is actuated.

6. An improved position indicating apparatus for a reciprocable element which comprises means for generating magnetic flux secured to and movable with said reciprocable element, a plurality of magnetically actuated switches disposed at discrete positions along the path of movement of said reciprocable element and adapted to be actuated by said magnetic flux, and circuit means connected to said plurality of switches to provide an indication of reciprocable element position; said circuit means comprising a relay circuit and an indicating circuit; said relay circuit including a power source, a plurality of relays each operating a plurality of contacts and each relay having a field coil connected to said power source in series with a corresponding one of said switches, each of said field coils being also connected to said power source in a second series circuit including a normally open set of contacts operated by said relay and a normally closed set of contacts operated by a relay which is actuated by any magnetic switch corresponding to the immediately adjacent position in one direction along said path and a normally closed set of contacts operated by a relay which is actuated by any magnetic switch corresponding to any and all positions along said path in the other direction, to provide at said current indicating means a series of discrete current readings corresponding to the discrete positions of said reciprocable element and to prevent excessive current drain on said power source in the event of fast linear motion.

References Cited by the Examiner
UNITED STATES PATENTS

| | | | |
|---|---|---|---|
| 1,617,287 | 2/27 | Huggins | 73—290.1 |
| 1,723,172 | 8/29 | Huggins | 340—193.2 |
| 2,634,376 | 4/53 | Eck | 317—139 |
| 2,678,434 | 5/54 | Brown | 340—244 |
| 2,820,865 | 1/58 | McKinnies | 200—84.3 |
| 2,842,003 | 7/58 | Fussangel | 317—137 |

FOREIGN PATENTS

| | | |
|---|---|---|
| 59,970 | 9/47 | Netherlands. |
| 669,932 | 4/52 | Great Britain. |
| 1,036,717 | 8/58 | Germany. |

NEIL C. READ, *Primary Examiner.*

E. JAMES SAX, L. MILLER ANDRUS, THOMAS B. HABECKER, STEPHEN W. CAPELLI, *Examiners.*